United States Patent Office 3,611,748
Patented Oct. 12, 1971

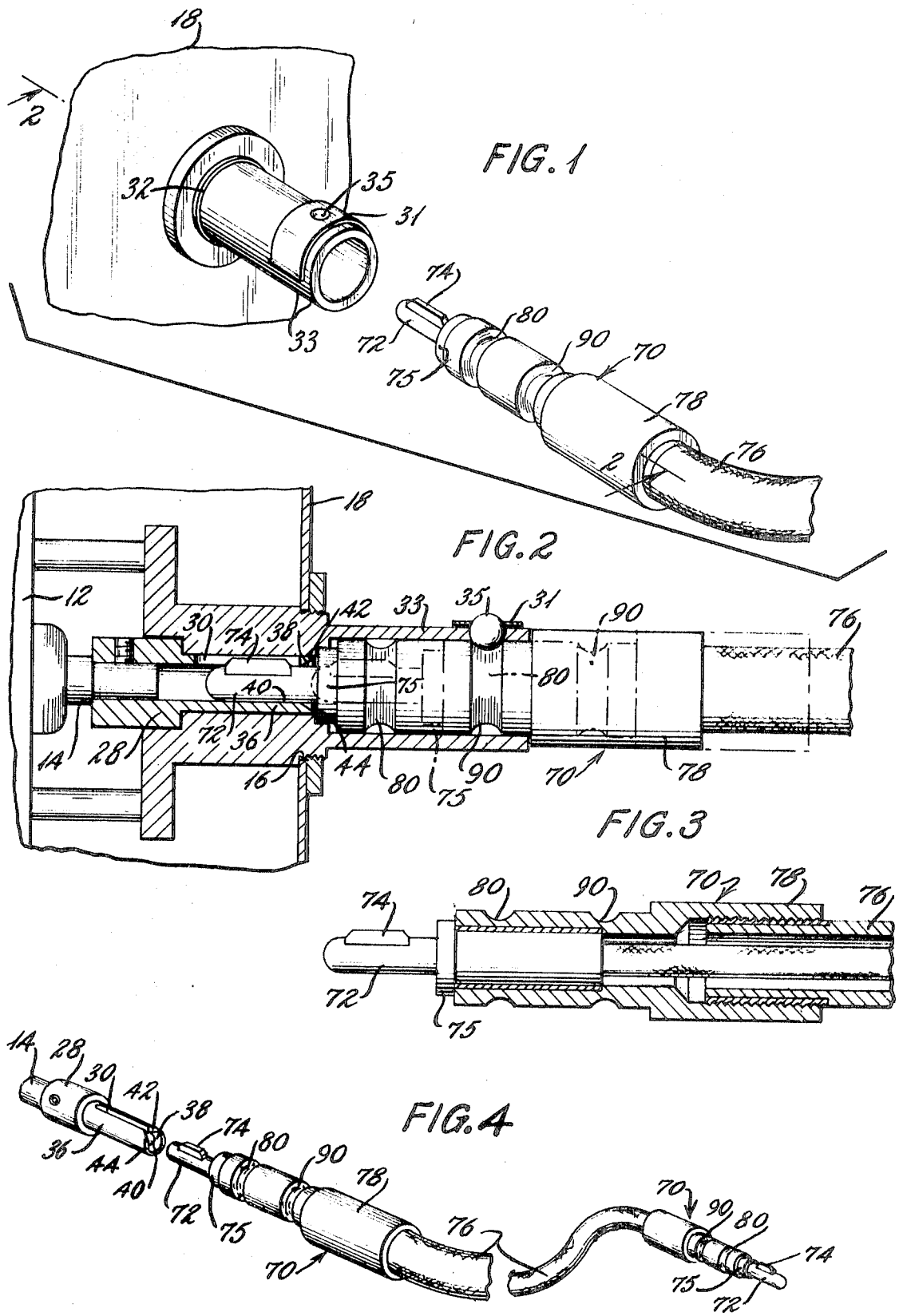

3,611,748
QUICK CONNECT FLEXIBLE DRIVE
Linus E. Wallgren, Rockville, Md., assignor to Pace,
Incorporated, Silver Spring, Md.
Filed May 28, 1970, Ser. No. 41,187
Int. Cl. F16d 3/06
U.S. Cl. 64—4          3 Claims

ABSTRACT OF THE DISCLOSURE

The invention relates to a male ended quick convert flexible drive shaft structure particularly adapted for use with an electronic equipment repair and maintenance unit. The male connection member is of special construction which permits the flexible drive to be connected and disconnected while the driving motor is in operation without completely removing the flexible drive shaft structure from the motor.

---

This invention is related to Pat. No. 3,411,594, for Maintenance Unit. That patent is directed to a system particularly adapted for the repair and reconstruction of electronic circuits and assemblies. The present invention relates also to Pat. 3,461,687 for Quick Convert Flexible Drive wherein the structure constitutes a double male ended flexible drive shaft particularly adapted for use with the maintenance unit. The present invention is specifically directed to the structure which permits a quick connect or disconnect of the flexible drive from the motor shaft yet leaves the flexible drive attached by the driving motor.

The tendency more and more towards micro miniaturization in electronic gear, i.e. printed circuit boards replace hand wired circuit, integrated circuits replace circuit boards, along with encapsulation of the entire circuit and high density packaging have added to the immeasurable difficulties of repair and maintenance of the electronic gear. The problems of repair and maintenance are further compounded by the broad variety of equipment types in widespread use and the minimal degree of manufacturing uniformity by the vast number of suppliers of electronic gear.

Serious efforts on the part of suppliers to insure high product quality and products of a maintenance free character are accompanied often by virtual refusal to face the reality of equipment failure. Frequently, the most complex and expensive piece of equipment must be shut down for failure of a single connection or of one inexpensive component. The truth of the matter is that maintenance and repair must be provided for; the repair technician must have tools commensurate with the complexity of modern electronic gear.

A virtually self contained versatile electronic repair unit which a skilled mechanic can employ as the equipment basis for making repairs on even the most complex electrical circuitry is disclosed in Pat. No. 3,411,594. A single compact housing contains components which make available to the repair technician the electrical power, mechanical drive power, vacuum and pressure by quick connection coupling on a panel face. A special double male ended flexible drive shaft adapted to be the mechanical drive takeoff from the maintenance unit is disclosed in Pat. No. 3,461,687. The present invention relates to a special quick connect structure which permits the flexible drive shaft to be connected and disconnected to the motor shaft yet remain attached to the stationary motor housing or to a shroud around the motor shaft.

For further understanding of the invention, reference is now made to the attached drawing wherein:

FIG. 1 is a diagrammatic view showing the mechanical drive and its connection to the front end of the motor pump, shown disassembled;

FIG. 2 is a side section taken along line 2—2 of FIG. 1 with the drive connected;

FIG. 3 is a side sectional view of the improved flexible drive; and

FIG. 4 is a diagrammatic view showing the flexible drive connection at the front end of the motor.

Referring now to the drawing, particularly to FIGS. 1 and 2, it may be seen that the drive shaft 14 of electric motor 12 is in line with an aperture 16 in the front panel face 18 of whatever structure (not shown) encloses motor 12. Since the electrical connections and on-off switches or controls normally associated with motor 12 are of the sort which would suggest themselves to those skilled in the art, they will not be therefore described in detail, nor have they been illustrated. Suffice it to say that their presence is contemplated. Typically motor 12 is a fractional horsepower motor, e.g., a 1/10 horsepower A.C. motor.

Directly mounted on the end of drive shaft 14 is a slot adapter 28, the slot being shown at 30. Surrounding the slot adapter 30 and axially spaced therefrom is a shroud 32 peripherally bolted or otherwise secured to the panel 18 and to the motor housing. On the end portion 33 of shroud 32 is provided a ball 35 loaded by a C-spring 31. Desirably the end portion 33 of shroud 32 extends forward of panel face 18. The slot adapter 28 itself has a relatively thick wall 36. In addition, adapter 28 is provided with a bevelled face 38 which flares outwardly from the central aperture 40 of adapter 28 with a V-shaped notch 42 at the entrance 44 of the adapter.

The mechanical drive attachment for use with the motor shaft is a special male ended quick connect flexible drive shaft assembly 70. Desirably a double male end assembly 70 with identical ends is employed. In any event the motor shaft prong end 72 is formed with an upstanding key 74 and a base hub 75 in bearing engagement within a non-rotating metal sleeve 78 at the base end of a non-rotating flexible sheath 76. The sheath 76 surrounds the usual coiled spring drive shaft. The metal sleeve 78 has thereon a first groove 80 formed adjacent the end of sleeve 78. A second like groove 90 is formed in sleeve 78, with grooves 80, 90 being spaced apart a distance equal to or greater than the length of the prong 72. When prong 72 is engaged in slot adapter 28 with key 74 seated in slot 30, sleeve 78 penetrates end portion 33 of shroud 32 deeply enough for the spring loaded ball 35 to lock, so to speak, in rearward groove 90. The flexible drive assembly 70 is then in connected driven engagement with motor shaft 14. The other end of the flexible drive assembly 70 may be connected through a spindle to a tool, suitably a little grinding wheel (not shown) in the same manner as contemplated in Pat. 3,461,687, for example.

The structure of slot adapter 28 has certain advantages. It permits connection to be made when motor 10 is running. The V-shaped notch 44 and bevelled face 38 create sufficient engagement with key 74 for the key to slip into the slot 30 despite the rotation of adapter 28. The relatively thick wall 36 largely encompasses prong 74. Moreover actual experience with equipment containing this quick connect flexible drive structure has demonstrated that the repair technician wants the ability to connect and disconnect flexible drive shaft assembly 70 while the motor 12 is running. However, the need to remove (temporarily) the disconnected drive assembly from the vicinity of the panel 18 and the motor has proven to be a nuisance. At the very least the repair technician disconnecting the flexible drive shaft assembly must push the freed prong end portion of the assembly off to one side of his working area. More desirable would be a connect and disconnect structure which permits a non-operating drive assembly to remain attached to the motor housing or panel face. Such is provided by the second groove 80 and detent arrangement on flexible drive assembly 70.

An allusion has already been made to how ball 35 seats in rearward groove 90 when prong 72 is engaged in slot adapter 28 and drive assembly 70 is being driven by motor 12. Provision of the forward groove 80 spaced apart (forwardly) from rear groove 90 a distance at least equal to the length of prong 72 permits the ball and groove detent structure to serve as retaining structure under a non-drive circumstance. Accordingly, when flexible shaft assembly 70 is inserted into shroud 32 forward groove 80 is first engaged by ball 35 to secure flexible drive shaft assembly 70 in an attached but non-driven relationship. The ball 35 on shroud 32 is spaced ahead of adapter 28 enough for the tip end of prong 72 to clear adapter 28. The motor drive shaft runs free. Yet pushing flexible drive further into shroud 32 causes ball 35 to ride out of groove 90 and permits prong end 72 to advance into engagement with slot adapter 28 and ultimately to a full driven engagement therewith, at which position ball 35 rests in groove 90.

A similar double groove detent structure may be provided at the other end of flexible drive shaft assembly 70.

The above description of the invention has been made in terms of preferred exemplary construction and uses therefor; changes and other uses as will suggest themselves to those skilled in the art are contemplated within the scope of the hereto appended claims.

What is claimed is:

1. A flexible drive assembly and a drive connection therefor which comprises:
   a sheathed flexible shaft terminating in a prong, the prong being formed with an upstanding key integral therewith the prong being disposed in bearing engagement with the terminus of the sheath of said flexible shaft;
   a slotted female drive connection member adapted for engagement with a prong end of said assembly characterized by a side wall of sufficient thickness to essentially encompass the key on the prong end within the slot of the female member, a notch in the side wall at the entrance to the slot therein and a bevelled face on the side wall of the entrance to the central aperture of the slotted female member;
   a stationary shroud surrounding said female member having thereon detent means;
   the terminus portion of said sheath on said flexible shaft having therein a pair of grooves spaced apart a distance at least equal to the length of the prong, the rearward of the grooves being engaged by the detent means on the shroud when the key on the prong end is full driven engagement within the slotted female drive connection member, the forward groove being alternatively engaged by the detent means in a non-driven status with the flexible drive assembly secured to the shroud but the prong clear of the slotted female drive connection member.

2. The apparatus of claim 1 wherein said detent means is a spring loaded ball which may seat in one of said grooves.

3. The apparatus of claim 1 wherein the sheath on the flexible shaft terminates in a metal sleeve and the grooves are formed in said sleeve.

References Cited

UNITED STATES PATENTS

| 1,357,364 | 11/1920 | Van Bree | 64—4 X |
| 3,411,594 | 11/1968 | Siegel | 173—170 |
| 3,461,687 | 8/1969 | Siegel | 64—2 |

FREDERICK L. MATTESON, Primary Examiner

H. B. RAMEY, Assistant Examiner

U.S. Cl. X.R.

64—23